United States Patent
Liang

(10) Patent No.: US 9,329,641 B2
(45) Date of Patent: May 3, 2016

(54) SECURING STRUCTURE AND AN ELECTRONIC DEVICE INCORPORATING THE SAME

(75) Inventor: Chen-Yi Liang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 388 days.

(21) Appl. No.: 13/570,509

(22) Filed: Aug. 9, 2012

(65) Prior Publication Data

US 2013/0052841 A1 Feb. 28, 2013

(30) Foreign Application Priority Data

Aug. 31, 2011 (TW) ............................... 100131269 A

(51) Int. Cl.
*E05C 19/06* (2006.01)
*G06F 1/16* (2006.01)

(52) U.S. Cl.
CPC ............ *G06F 1/1684* (2013.01); *G06F 1/1633* (2013.01)

(58) Field of Classification Search
USPC ................................................. 292/251.5, 80
See application file for complete search history.

(56) References Cited

U.S. PATENT DOCUMENTS

| | | | |
|---|---|---|---|
| 3,418,018 A * | 12/1968 | Marburger | E05C 19/16 29/404 |
| 4,550,230 A | 10/1985 | Johnson | |
| 6,517,129 B1 * | 2/2003 | Chien et al. | 292/251.5 |
| 2002/0105401 A1 | 8/2002 | Shih-Chung et al. | |
| 2005/0167992 A1 * | 8/2005 | Lo et al. | 292/251.5 |

FOREIGN PATENT DOCUMENTS

| | | |
|---|---|---|
| CN | 201251726 Y | 6/2009 |
| TW | I254602 | 5/2006 |
| TW | M319635 | 9/2007 |
| TW | M346048 | 12/2008 |
| TW | M349166 | 1/2009 |

OTHER PUBLICATIONS

Taiwanese Office Action issued Jun. 16, 2014 in Taiwanese Application No. 100131269, with partial English Translation (8 pages).

(Continued)

*Primary Examiner* — Mark Williams
(74) *Attorney, Agent, or Firm* — Nixon & Vanderhye P.C.

(57) ABSTRACT

A securing structure for securing a magnetic element in a housing of an electronic device includes a receiving portion and a limiting portion. The receiving portion is to be disposed on a housing wall of the housing, and has a receiving space for receiving the magnetic element therein and a first opening in spatial communication with the receiving space for permitting extension of the magnetic element into the receiving space. The first opening faces a plane perpendicular to the housing wall. The limiting portion is connected to the receiving portion and is operable between a limiting state, where the first limiting portion prevents the magnetic element from entering and exiting the receiving space through the first opening, and a non-limiting state, where the first limiting portion permits entering and exiting of the magnetic element into and from the receiving space through the first opening.

12 Claims, 5 Drawing Sheets

(56) References Cited

OTHER PUBLICATIONS

Chinese Office Action mailed Aug. 26, 2014 in Chinese Application No. 201110281442.4, with partial English translation (9 pages).

Jan. 8, 2016 Office Action issued in Chinese Counterpart Application No. 201110281442.4 by the State Intellectual Property Office of the P.R.C. (with English-language translation of the boxed sections).

* cited by examiner

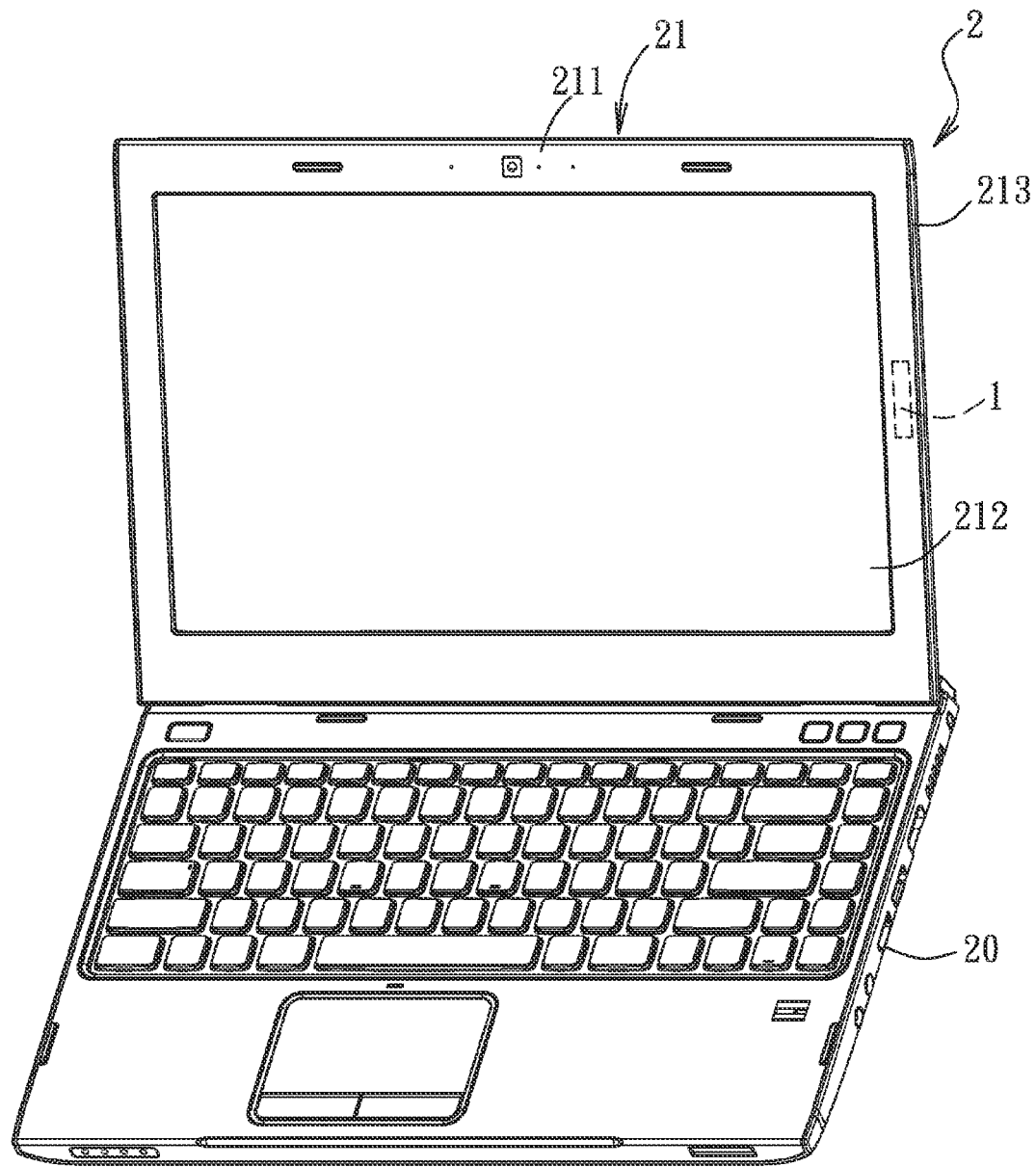
F I G. 1

SECURING STRUCTURE AND AN ELECTRONIC DEVICE INCORPORATING THE SAME

CROSS REFERENCE TO RELATED APPLICATION

This application claims priority of Taiwanese Patent Application No. 100131269 filed on Aug. 31, 2011, the disclosure of which is incorporated herein by reference.

BACKGROUND OF THE INVENTION

1. Field of the Invention

The invention relates to a securing structure, more particularly to a securing structure that is adapted for accommodating a component such as a magnet, a magnetic element (e.g., a metal piece attractable by a magnet), or a magnetic switch, etc., and an electronic device incorporating such a securing structure.

2. Description of the Related Art

In U.S. Pat. No. 7,813,125, there is disclosed a latch mechanism for latching a monitor and a host of a portable computer to prevent unintentional lifting of the monitor from the host. In U.S. Pat. No. 6,653,919, there is disclosed a magnetic closure apparatus for portable computers which permits locking and unlocking of a portable computer by virtue of magnetic attraction.

SUMMARY OF THE INVENTION

The object of the present invention is to provide a securing structure different from the prior art, and used for accommodating a component such as a magnet, a magnetic element (e.g., a metal piece attractable by a magnet), or a magnetic switch.

Another object of the present invention is to provide a securing structure, which can be assembled to a housing of an electronic device without affecting the intensity of magnetic attraction of a magnetic element.

Yet another object of the present invention is to provide an electronic device provided with the aforesaid securing structure.

According to one aspect of the present invention, there is provided a securing structure for securing a magnetic element in a housing of an electronic device. The housing includes a housing wall. The securing structure includes a receiving portion and a first limiting portion. The receiving portion is to be disposed on the housing wall, and has a receiving space for receiving the magnetic element therein and a first opening in spatial communication with the receiving space for permitting extension of the magnetic element into the receiving space. The first opening faces a plane perpendicular to the housing wall. The first limiting portion is connected to the receiving portion and is operable between a limiting state, where the first limiting portion prevents the magnetic element from entering and exiting the receiving space through the first opening, and a non-limiting state, where the first limiting portion permits entering and exiting of the magnetic element into and from the receiving space through the first opening.

Moreover, the receiving portion further has a second opening disposed in spatial communication with the receiving space and facing the housing wall. The securing structure further includes a second limiting portion disposed in the receiving space for preventing the magnetic element from exiting the receiving space through the second opening.

The receiving portion includes a base wall to be secured on the housing wall, and a U-shape surrounding wall connected to the base wall, cooperating with the base wall to define the receiving space, and having two side wall parts and an end wall part. The end wall part connects the side wall parts and cooperates with the side wall parts to define the second opening. Ends of the side wall parts opposite to the end wall part cooperatively define the first opening.

The first limiting portion includes two operating arms respectively connected to said ends of the side wall parts, and a hook connected to the operating arms and extending toward the base wall. The hook prevents the magnetic element from entering and exiting the receiving space through the first opening when the first limiting portion is in the limiting state. The operating arms are operable to move the hook relative to and away from the base wall so as to bring the first limiting portion from the limiting state to the non-limiting state.

The operating arms are resiliently deformable. The hook has an inclined guiding surface that faces away from the receiving space. The inclined guiding surface is pushed against by the magnetic element as the magnetic element moves toward the receiving space such that the operating arms are resiliently deformed to move away from the base wall and to bring the first limiting portion into the non-limiting state so as to permit entering of the magnetic element into the receiving space.

The first limiting portion and the U-shape surrounding wall cooperatively define the second opening. The hook has a stop surface that faces the receiving space and that is to be abutted against by the magnetic element when the magnetic element is received in the receiving space and when the first limiting portion is in the limiting state so as to prevent removal of the magnetic element from the receiving space through the first opening.

The second opening is spaced apart from the base wall. The second limiting portion includes two opposite inner surfaces that are respectively disposed on the side wall parts of the U-shape surrounding wall, that are disposed between the base wall and the second opening, and that are inclined toward each other in a direction from the base wall to the second opening.

The securing structure further includes two first guide ribs disposed on the base wall proximate to the first opening, and aligned respectively with the side wall parts for guiding the magnetic element therebetween to enter the receiving space.

Optionally, the securing structure further includes two second guide ribs, each of which is disposed between a corresponding one of the first guide ribs and a corresponding one of the side wall parts. The second guide ribs assist to retain the magnetic element in the receiving space.

According to another aspect of the present invention, there is provided an electronic device including a first machine body, a second machine body, a magnetic element, and the aforesaid securing structure. The second machine body is connected pivotably to the first machine body, is operable to cover the first machine body, and includes a housing that includes a housing wall and an electronic module that is disposed in the housing. The securing structure is disposed in the second machine body and is for accommodating the magnetic element.

BRIEF DESCRIPTION OF THE DRAWINGS

Other features and advantages of the present invention will become apparent in the following detailed description of the embodiment with reference to the accompanying drawings, of which:

FIG. 1 is a schematic view illustrating the embodiment of a securing structure according to the present invention assembled to a notebook computer;

DETAILED DESCRIPTION OF THE EMBODIMENT

Figure 2:
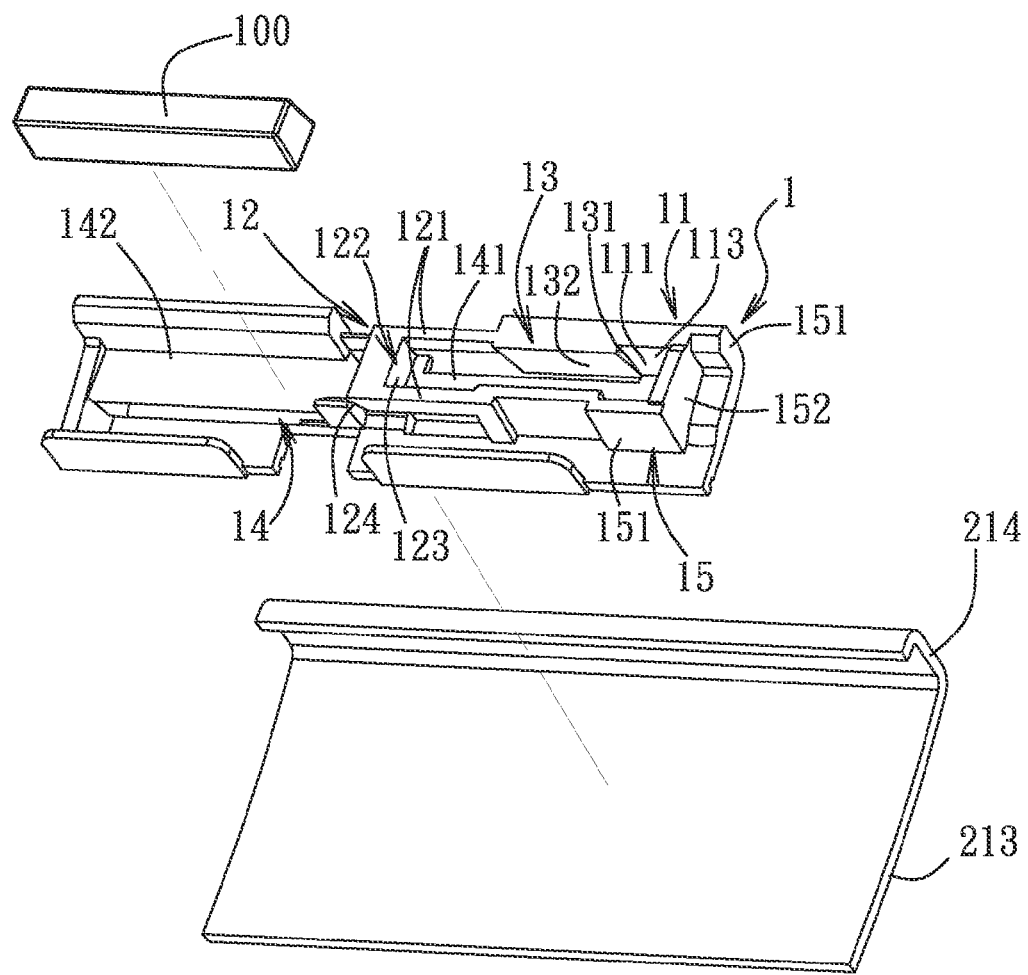
FIG. 2 is a perspective view of the embodiment, along with a magnetic element and a housing wall of the notebook computer.

Before the present invention is described in greater detail with reference to the accompanying embodiments, it should be noted herein that like elements are denoted by the same reference numerals throughout the disclosure.

As shown in FIGS. 1 and 2, the embodiment of a securing structure 1 according to the present invention is disposed in a notebook computer 2. The notebook computer 2 includes a first machine body 20 and a second machine body 21 that is connected pivotably to the first machine body 20 and that is operable to cover the first machine body 20. In this embodiment, the first machine body 20 is a host machine body and the second machine body 21 is a monitor machine body. The second machine body 21 includes a housing 211 and an electronic module 212 disposed in the housing 211. Herein, the electronic module 212 is a display panel module, and the housing 211 includes a housing wall 213 and has a housing edge 214. In this embodiment, the housing wall 213 refers to a back plate of the monitor machine body.

The securing structure 1 is disposed in the second machine body 21 for accommodating a magnetic element 100 therein. In addition, the magnetic element 100 is only disposed in the securing structure 1 after the securing structure 1 is mounted to the second machine body 21. The magnetic element 100 is used to cooperate with a magnetic switch or a magnetic component disposed in the first machine body 20 to maintain a covering state of the first and second machine bodies 20, 21. Of course, the securing structure 1 may also be mounted to the first machine body 20 instead of the second machine body 21 for securing the magnetic switch or the magnetic element in other embodiments of the present invention.

Figure 3:
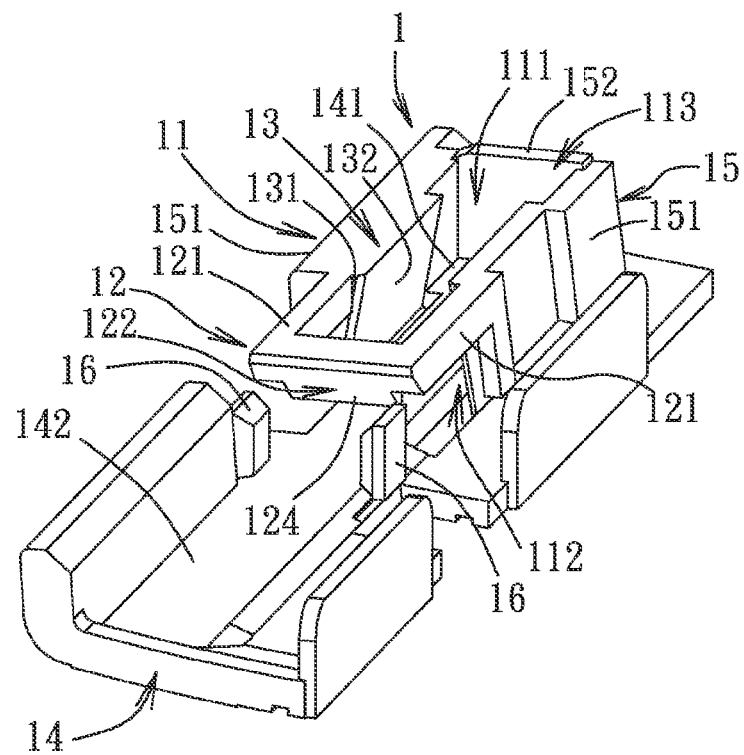
FIG. 3 is a perspective view of the embodiment at a different angle.

Referring to FIGS. 2 and 3, the securing structure 1 is to be mounted on the housing wall 213 of the housing 211 of the second machine body 21, and includes a receiving portion 11, a first limiting portion 12 and a second limiting portion 13. In practice, the securing structure 1 of the embodiment is integrally formed by a plastic material.

Specifically, the receiving portion 11 is disposed on the housing wall 213, and includes a base wall 14 to be secured on the housing wall 213, and a U-shape surrounding wall 15 connected to the base wall 14 and extending perpendicularly relative to the base wall 14. The receiving portion 11 has a receiving space 111 for receiving the magnetic element 100 therein, and first and second openings 112, 113 in spatial communication with the receiving space 111. The base wall 14 cooperates with the U-shape surrounding wall 15 to define the receiving space 111. The U-shape surrounding wall 15 defines the first opening 112 and the second opening 113. The first opening 112 faces a plane perpendicular to the housing wall 213, and the second opening 113 faces the housing wall 213. The first opening 112 permits extension of the magnetic element 100 into the receiving space 111.

In detail, the U-shape surrounding wall 15 has two spaced apart side wall parts 151, and an end wall part 152 connecting the side wall parts 151 and cooperating with the side wall parts 151 to define the second opening 113. Ends of the side wall parts 151 opposite to the end wall part 152 cooperatively define the first opening 112. As such, the magnetic element 100 is operable to enter or exit the receiving space 111 through the first opening 112 in a direction parallel to the base wall 14. On the other hand, the second opening 113 is spaced apart from the base wall 14.

In this embodiment, the magnetic element 100 is a magnet, but it can also be a metal piece attractable by a magnet, or a magnetic switch, etc., in other embodiments of the present invention.

Figure 5:
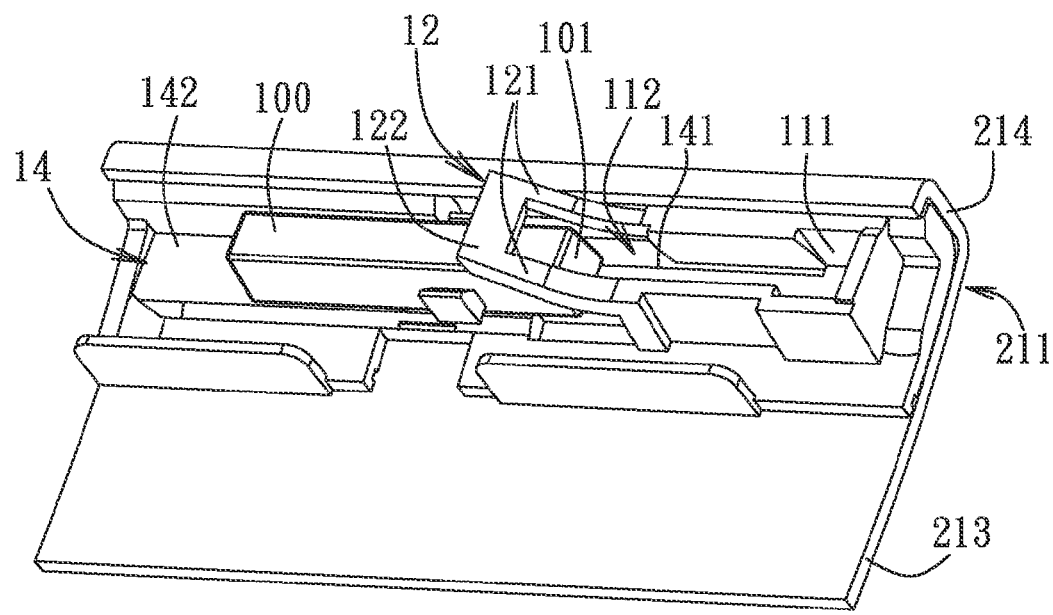

The first limiting portion 12 is connected to the receiving portion 11 and is operable between a limiting state (as best shown in FIGS. 2 and 3), where the first limiting portion 12 prevents the magnetic element 100 from entering and exiting the receiving space 111 through the first opening 112, and a non-limiting state (as best shown in FIG. 5), where the first limiting portion 12 permits entering and exiting of the magnetic element 100 into and from the receiving space 111 through the first opening 112.

Moreover, the first limiting portion 12 of this embodiment includes two operating arms 121 and a hook 122. The operating arms 121 are respectively connected to said ends of the side wall parts 151 opposite to the end wall part 152, extend away from the first opening 112, and are spaced apart form the base wall 14. The hook 122 is a protruding block connected to free ends of the operating arms 121 opposite to said ends of the side wall parts 151, and extends toward the base wall 14. The hook 122 prevents the magnetic element 100 from entering and exiting the receiving space 111 through the first opening 112 when the first limiting portion 12 is in the limiting state. The operating arms 121 are operable to move the hook 122 relative to and away from the base wall 14 so as to bring the first limiting portion 12 from the limiting state to the non-limiting state. In this embodiment, the operating arms 121 are made of a resilient material so as to be resiliently deformable. However, in other embodiments of the present invention, the operating arms 121 may as well be configured to be connected pivotably to the side wall parts 151, and operable to move the hook 122 away from the base wall 14 with the provision of torsion springs. In this embodiment, the second opening 113 is defined by the first limiting portion 12 and the U-shape surrounding wall 15 of the receiving portion 11.

Specifically, the hook 122 of this embodiment has a stop surface 123 facing the receiving space 111, and an inclined guiding surface 124 opposite to the stop surface 123. In other words, the inclined guiding surface 124 faces away from the receiving space 111. In addition, the inclined guiding surface 124 is inclined toward the first opening 112 as it extends toward the base wall 14.

Figure 4:
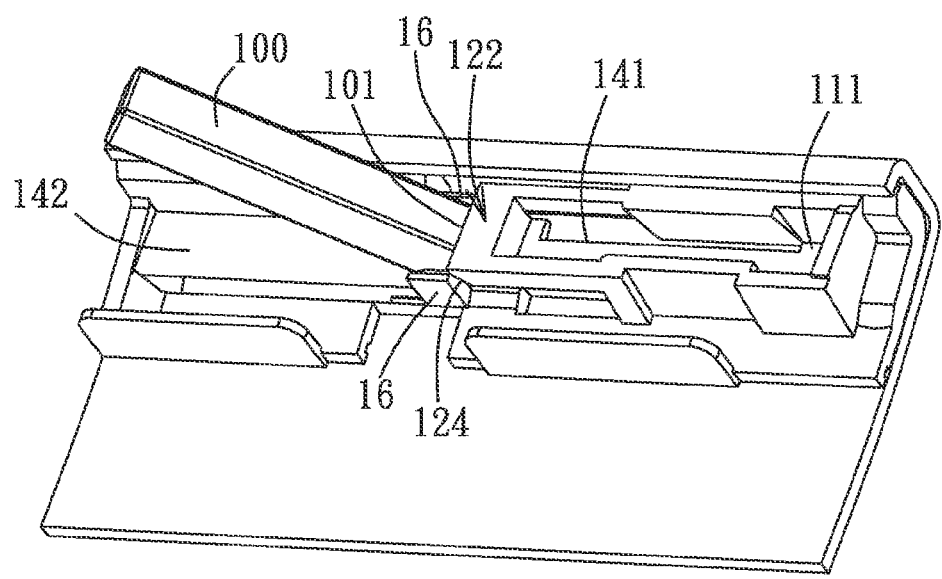
FIGS. 4 to 6 are schematic diagrams cooperatively illustrating the process of disposing the magnetic element into a receiving space of the embodiment.
Figure 6:
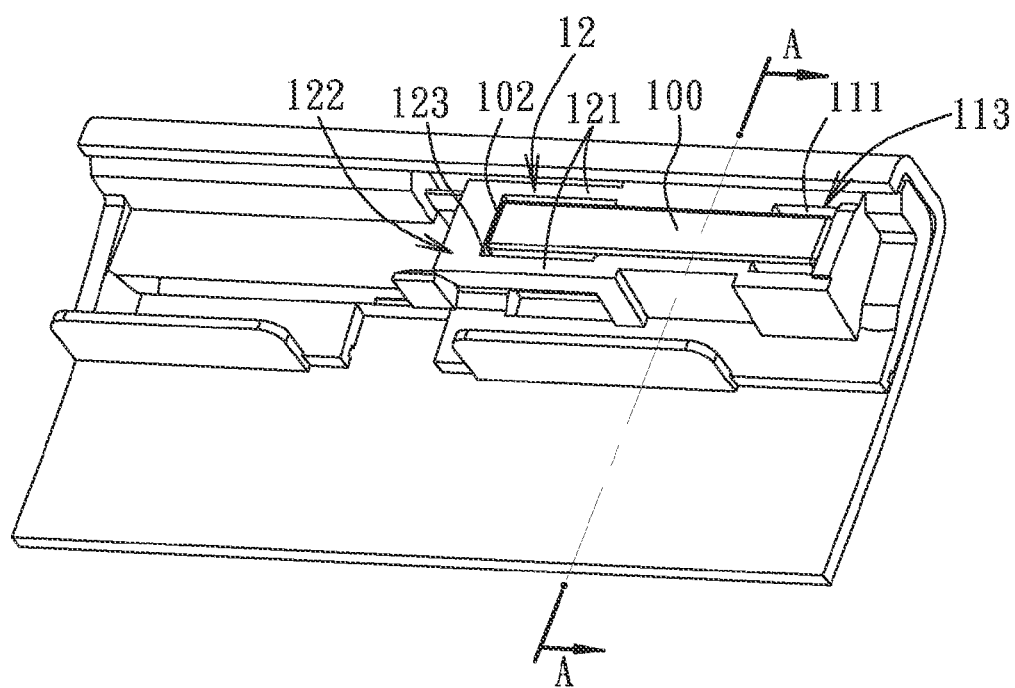

Referring to FIGS. 4 and 5, to dispose the magnetic element 100 in the receiving space 111, a first end 101 of the magnetic element 100 is first moved to abut against the inclined guiding surface 124 of the hook 122 of the first limiting portion 12. Next, as the magnetic element 100 moves toward the receiving space 111, with the inclined guiding surface 124 pushed against by the magnetic element 100, the hook 122 is moved away from the base wall 14 as shown in FIG. 5, where the operating arms 121 are resiliently deformed to move, together with the hook 122, away from the base wall 14 and to bring the first limiting portion 12 into the non-limiting state so as to permit entering of the magnetic element 100 into the receiving space 111 through the first opening 112. Then, referring to FIG. 6, when the magnetic element 100 is completely received in the receiving space 111 and disengaged from the hook 122 of the first limiting portion 12, by virtue of resiliency, the hook 122 gradually moves toward the base wall 14 until the first limiting portion 12 is disposed in the limiting state, at which point, the stop surface 123 of the hook 12 is abutted against by a second end 102 of the magnetic element 100 so as to prevent removal of the magnetic element 100 from the receiving space 111 through the first opening 112. At this moment, the magnetic element 100 is exposed from the second opening 113. Later on, if it is desired to move the magnetic element 100 out of the receiving space 111, it is only necessary to lift the hook 122 away from the base wall 14 such that the first limiting portion 12 is disposed in the non-limiting state, the magnetic element 100 can be permitted to move out of the receiving space 111 through the first opening 112. Therefore, the provision of the first limiting portion 12 increases convenience for the assembly of the magnetic element 100 to the securing structure 1.

It is worth to mention that, in this embodiment, since the magnetic element 100 has a rather greater height, to pass under the hook 122 of the first limiting portion 12, the magnetic element 100 is first disposed slantingly relative to the base wall 14, and then the first end 101 of the magnetic element 100 is used to push the hook 122 away from the base wall 14. However, in the case when the magnetic element 100 has an appropriate height, the magnetic element 100 can simply be moved to slide along the base wall 14 to achieve the same effect of pushing the hook 122 away from the base wall 14.

Figure 7:
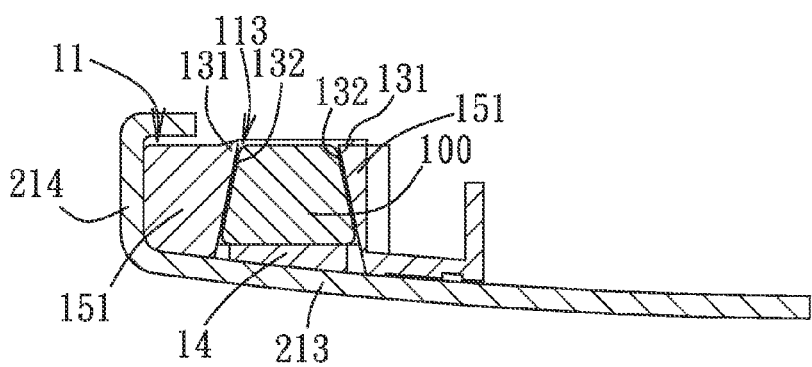
FIG. 7 is a sectional view of the embodiment taken along line A-A of FIG. 6.

Referring to FIGS. 2, 3, 6 and 7, the second limiting portion 13 is disposed in the receiving space 111 for preventing the magnetic element 100 from exiting the receiving space 111 through the second opening 113. Specifically, the second limiting portion 13 of this embodiment includes two protruding blocks 131 that are formed respectively on the side wall parts 151 of the U-shape surrounding wall 15, and two opposite inner wall surfaces 132 that are defined respectively by the protruding blocks 131. Each of the protruding blocks 131 has a downward tapering wedge shape. The inner wall surfaces 132 are disposed between the base wall 14 and the second opening 113, and are inclined toward each other in a direction from the base wall 14 to the second opening 113. In other words, as shown in FIG. 7, the cross section of the receiving portion 117 taken perpendicularly to the side wall parts 151 has a shape of an upward tapering isosceles trapezoid.

The inclining design of the inner wall surfaces 132 is to make sure that the second opening 113 has an opening size small enough to prevent the magnetic element 100 from passing therethrough, such that when the magnetic element 100 is received in the receiving space 111, the magnetic element 100 is prevented from exiting the receiving portion 11 through the second opening 113. Moreover, the inclining design also allows magnetic elements 100 with varying geometric shapes to abut against the inner wall surfaces 132 at different positions so as to achieve the same effect of preventing the magnetic elements 100 from displacement in a direction toward the second opening 113.

Furthermore, the height of the U-shape surrounding wall 15 relative to the base wall 14 can be configured such that when the magnetic element 100 is received in the receiving space 111, the top of the magnetic element 100 is disposed in the second opening 113 and is generally leveled with the top of the U-shape surrounding wall 15 (as best shown in FIG. 7), or protrudes through the second opening 113. Since the receiving portion 11 does not have a top wall to cover the top of the magnetic element 100, the height of the securing structure 1 is reduced, and the space needed thereby in the housing 211 is also reduced.

Moreover, referring to FIGS. 3 and 4, the base wall 14 of this embodiment has an elongated shape and can be divided into a first section 141 and a second section 142 connected to each other. The U-shape surrounding wall 15 is connected to the first section 141 of the base wall 14, and the first opening 112 faces the second section 142. In addition, the securing structure 1 further includes two first guide ribs 16 disposed on the base wall 14, between the first section 141 and the second section 142, and proximate to the first opening 112. The first guide ribs 16 are aligned respectively with the side wall parts 151 for guiding the magnetic element 100 therebetween to enter the receiving space 111 through the first opening 112. On the other hand, the second section 142 of the base wall 14 is used for placement of the magnetic element 100 before the same is pushed to slide into the receiving space 111 through the first opening 112.

Figure 8:
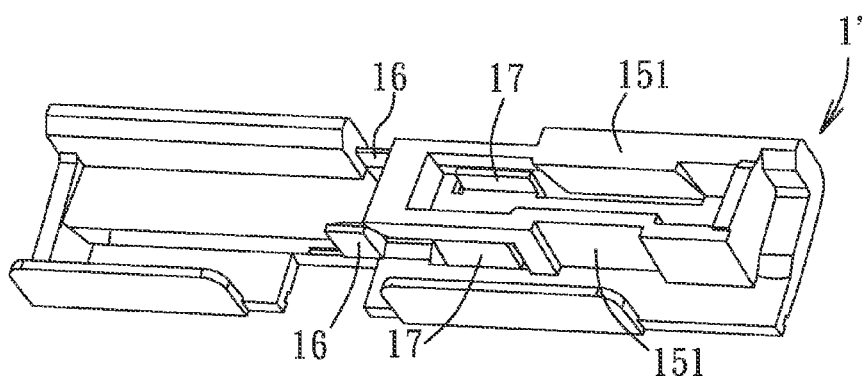
FIG. 8 is a perspective view of a modification of the embodiment.

Furthermore, referring to FIG. 8, in a modification of the embodiment, the securing structure 1' further includes two second guide ribs 17, each of which is disposed on the base wall 14 between a corresponding one of the first guide ribs 16 and a corresponding one of the side wall parts 151. The second guide ribs 17 may be walls, and are for assisting in the retention of the magnetic element 100 in the receiving space 111. In other words, the two second guide ribs 17 can be viewed as extensions of the two side wall parts 151.

Figure 9:
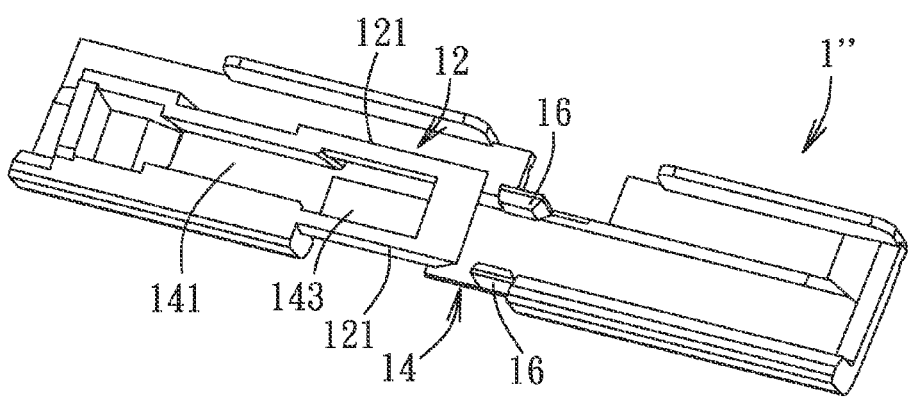
FIG. 9 is a perspective view of another modification of the embodiment.

Furthermore, referring to FIG. 9, in another modification of the embodiment of the securing structure 1", to accommodate molding requirements, the first section 141 of the base wall 14 may be formed with a notch 143 without affecting the assembly of the magnetic element 100 to the securing structure 1". In addition, the distance between the operating arms 121 may also vary as required in practice.

In sum, the present invention provides the receiving portion 11, which cooperates with the first and second limiting portions 12, 13 to achieve a securing structure 1, 1', 1" different from the prior art.

Moreover, since the magnetic element 100 is disposed in the receiving space 111 after the securing structure 1, 1', 1" is mounted to the housing 211, the selection of the magnetic element 100 may be made without considering factors such as the adverse influence on the intensity of magnetic attraction of the magnetic element 100 due to the high temperatures exposed to the securing structure 1, 1', 1" when the same is coupled to the housing 211 through high-temperature bonding, NMT technology, etc. In other words, according to the present invention, unlike the prior art, it is not necessary for the magnetic element 100 to have a higher the intensity of magnetic attraction than necessary so as to leave room for reduction of the same during high-temperature bonding of the securing structure 1, 1', 1" and the housing 211. Moreover, since the magnetic element 100 is exposed from the second opening 113, the securing structure 1, 1', 1" of the present invention does not provide a barrier to the magnetic attraction between the magnetic element 100 received therein and the magnetic component/switch in the first machine body 20. Therefore, the magnetic element 100 may be chose to have a relatively weaker intensity of magnetic attraction than the prior art to reduce material cost. Furthermore, with the second limiting portion 13 preventing the magnetic element 100 from exiting the receiving space 111, and with the provision of the second opening 113, the height of the securing structure 1, 1', 1" may be made lower than that of the magnetic element 100 to thereby reduce the space occupied by the securing structure 1, 1', 1" in the housing 211, such that the securing structure 1, 1', 1" may be adopted in a thinner and more compact electronic device housing.

While the present invention has been described in connection with what is considered the most practical embodiment, it is understood that this invention is not limited to the disclosed embodiment but is intended to cover various arrangements included within the spirit and scope of the broadest interpretation so as to encompass ail such modifications and equivalent arrangements.

What is claimed is:

1. A securing structure for securing a magnetic element in a housing of an electronic device, the housing including a housing wall, said securing structure comprising:
   a receiving portion configured to be disposed on the housing wall, and having a receiving space for receiving the magnetic element therein and a first opening in spatial communication with said receiving space for permitting extension of the magnetic element into said receiving space, said first opening adapted to face a plane perpendicular to the housing wall; and
   a first limiting portion that is cantilevered, includes an angled guiding face, and is connected to said receiving portion and while the first limiting portion remains connected to the receiving portion, the first limiting portion is movable relative to the receiving portion, between a limiting state, where said first limiting portion is adapted to prevent the magnetic element from entering and exiting said receiving space through said first opening, and a non-limiting state, where said first limiting portion is adapted to permit entering and exiting of the magnetic element into and from said receiving space through said first opening,
   wherein the first limiting portion moves between the limiting state and the non-limiting state by flexing transverse to an exiting and entering direction of the magnet;
   said receiving portion further has a second opening disposed in spatial communication with said receiving space and adapted to face the housing wall;
   said securing structure further comprising a second limiting portion disposed in said receiving space for preventing the magnetic element from exiting said receiving space through said second opening;
   said receiving portion includes a base wall to be secured on the housing wall, and a U-shape surrounding wall connected to said base wall, cooperating with said base wall to define said receiving space, and having two side wall parts and an end wall part, said end wall part connecting said side wait parts and cooperating with said side wall parts to define said second opening, ends of said side wall parts opposite to said end wall part cooperatively defining said first opening;
   said second opening is spaced apart from said base wall, said second limiting portion including two opposite inner surfaces that are respectively disposed on said side wall parts of said U-shape surrounding wall, that are disposed between said base wall and said second opening, and that are inclined toward each other in a direction from said base wall to said second opening; and
   said magnetic element having a maximum width that is smaller than a minimum distance between said inner surfaces of said second limiting portion.

2. The securing structure as claimed in claim 1, wherein said first limiting portion includes two operating arms respectively connected to said ends of said side wall parts, and a hook connected to said operating arms and extending toward said base wall, said hook adapted to prevent the magnetic element from entering and exiting said receiving space through said first opening when said first limiting portion is in the limiting state, said operating arms being operable to move said hook relative to and away from said base wall so as to bring said first limiting portion from the limiting state to the non-limiting state.

3. The securing structure as claimed in claim 2, wherein said operating arms are resiliently deformable, said hook having an inclined guiding surface that faces away from said receiving space, said inclined guiding surface being adapted to be pushed against by the magnetic element as the magnetic element moves toward said receiving space such that said operating arms are resiliently deformed to move away from said base wall and to bring said first limiting portion into the non-limiting state so as to permit entering of the magnetic element into said receiving space.

4. The securing structure as claimed in claim 2, wherein said first limiting portion and said U-shape surrounding wall cooperatively define said second opening, said hook having a stop surface that faces said receiving space and that is adapted to be abutted against by the magnetic element when the magnetic element is received in said receiving space and when said first limiting portion is in the limiting state so as to prevent removal of the magnetic element from said receiving space through said first opening.

5. The securing structure as claimed in claim 1, further comprising two first guide ribs disposed on said base wall proximate to said first opening, and aligned respectively with said side wall parts for guiding the magnetic element therebetween to enter said receiving space.

6. The securing structure as claimed in claim 5, further comprising two second guide ribs, each of which is disposed between a corresponding one of said first guide ribs and a corresponding one of said side wall parts, said second guide ribs adapted to assist retention of the magnetic element in said receiving space.

7. An electronic device comprising:
   a first machine body;
   a second machine body connected pivotably to said first machine body, operable to cover said first machine body, and including a housing that includes a housing wall and an electronic module that is disposed in said housing;
   a magnetic element; and
   a securing structure disposed in said second machine body, and including a receiving portion disposed on said housing wall, and having a receiving space for receiving said magnetic element therein and a first opening in spatial communication with said receiving space for permitting extension of said magnetic element into said receiving space, said first opening facing a plane perpendicular to said housing wall, and
   a first limiting portion that is cantilevered, includes an angled guiding face, and is connected to said receiving portion and while the first limiting portion remains connected to the receiving portion, the first limiting portion is movable relative to the receiving portion, between a limiting state, where said first limiting portion prevents said magnetic element from entering and exiting said receiving space through said first opening, and a non-limiting state, where said first limiting portion permits entering and exiting of said magnetic element into and from said receiving space through said first opening, wherein the first limiting portion moves between the limiting state and the non-limiting state by flexing transverse to an exiting and entering direction of the magnet;

said receiving portion further has a second opening disposed in spatial communication with said receiving space and adapted to face the housing wall;

said securing structure further comprising a second limiting portion disposed in said receiving space for preventing the magnetic element from exiting said receiving space through said second opening;

said receiving portion includes a base wall to be secured on the housing wall, and a shape surrounding wall connected to said base wall, cooperating with said base wall to define said receiving space, and having two side wall parts and an end wall part, said end wall part connecting said side wall parts and cooperating with said side wall parts to define said second opening, ends of said side wall parts opposite to said end wall part cooperatively defining said first opening;

said second opening is spaced apart from said base wall, said second limiting portion including two opposite inner surfaces that are respectively disposed on said side wall parts of said U-shape surrounding wall, that are disposed between said base wall and said second opening, and that are inclined toward each other in a direction from said base wall to said second opening; and said magnetic element having a maximum width that is smaller than a minimum distance between said inner surfaces of said second limiting portion.

8. The electronic device as claimed in claim 7, wherein said first limiting portion includes two operating arms respectively connected to said ends of said side wall parts, and a hook connected to said operating arms and extending toward said base wall, said hook preventing said magnetic element from entering and exiting said receiving space through said first opening when said first limiting portion is in the limiting state, said operating arms being operable to move said hook relative to and away from said base wall so as to bring said first limiting portion from the limiting state to the non-limiting state.

9. The electronic device as claimed in claim 8, wherein said operating arms are resiliently deformable, said hook having an inclined guiding surface that faces away from said receiving space, said inclined guiding surface being pushed against by said magnetic element as said magnetic element moves toward said receiving space such that said operating arms are resiliently deformed to move away from said base wall and to bring said first limiting portion into the non-limiting state so as to permit entering of said magnetic element into said receiving space.

10. The electronic device as claimed in claim 8, wherein said first limiting portion and said U-shape surrounding wall cooperatively define said second opening, said hook having a stop surface that faces said receiving space and that is to be abutted against by said magnetic element when said magnetic element is received in said receiving space and when said first limiting portion is disposed in the limiting state so as to prevent removal of said magnetic element from said receiving space through said first opening.

11. The electronic device as claimed in claim 7, further comprising two first guide ribs disposed on said base wall proximate to said first opening, and aligned respectively with said side wall parts for guiding said magnetic element therebetween to enter said receiving space.

12. The electronic device as claimed in claim 11, further comprising two second guide ribs, each of which is disposed between a corresponding one of said first guide ribs and a corresponding one of said side wall parts, said second guide ribs assisting retention of said magnetic element in said receiving space.

\* \* \* \* \*